United States Patent
Meichle et al.

(10) Patent No.: US 8,762,603 B2
(45) Date of Patent: Jun. 24, 2014

(54) ADDRESSABLE FIFO

(75) Inventors: Joachim Meichle, Nürnberg (DE);
Frederik Lange, Nürnberg (DE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 0 days.

(21) Appl. No.: 13/510,419

(22) PCT Filed: Nov. 25, 2009

(86) PCT No.: PCT/EP2009/065827
§ 371 (c)(1),
(2), (4) Date: Jul. 19, 2012

(87) PCT Pub. No.: WO2011/063832
PCT Pub. Date: Jun. 3, 2011

(65) Prior Publication Data
US 2012/0278516 A1    Nov. 1, 2012

(51) Int. Cl.
*G06F 3/00*    (2006.01)
*G06F 5/00*    (2006.01)

(52) U.S. Cl.
USPC .......................................... 710/52; 711/118

(58) Field of Classification Search
None
See application file for complete search history.

(56) References Cited

U.S. PATENT DOCUMENTS

| | | | |
|---|---|---|---|
| 7,733,878 B2 * | 6/2010 | Knight et al. | 370/395.7 |
| 7,802,054 B2 * | 9/2010 | Park et al. | 711/117 |
| 8,121,150 B1 * | 2/2012 | Nelson | 370/471 |
| 2004/0030816 A1 * | 2/2004 | Knight et al. | 710/52 |
| 2004/0076147 A1 * | 4/2004 | Loge et al. | 370/386 |
| 2008/0126507 A1 | 5/2008 | Wilkinson | |
| 2009/0259786 A1 | 10/2009 | Lin | |
| 2009/0307437 A1 * | 12/2009 | Lee et al. | 711/149 |

* cited by examiner

Primary Examiner — Elias Mamo
(74) Attorney, Agent, or Firm — Coats & Bennett, P.L.L.C.

(57) ABSTRACT

A device (100) for managing transmission of data words between a data source entity (102) and a data destination entity (104), the device (100) comprising a write interface (106) for receiving data words from the data source entity (102), a read interface (108) for forwarding data words to the data destination entity (104), and a buffer memory (110) adapted for temporarily storing data words to be transmitted from the write interface (106) to the read interface (108), wherein the data words are stored in an order in which they are received from the write interface (106), wherein data words in the buffer memory (110) are addressable for reading at least a part of an addressed data word in such a way that this data word remains stored in the buffer memory (110) after reading.

14 Claims, 4 Drawing Sheets

ADDRESSABLE FIFO

TECHNICAL FIELD

The invention relates to data buffering, especially to a device for managing transmission of data words between a data source entity and a data destination entity, a method of managing transmission of data words between a data source entity and a data destination entity, a computer program adapted to perform such a method, and a computer-readable medium product comprising such a computer program.

BACKGROUND

In (for instance embedded) multi-processor computing systems, it is a common task to exchange data between processors (Central Processing Units, CPU). Especially when the CPUs reside on different ASICs (Application Specific Integrated Circuit) this is not a trivial task. An ASIC may denote a "System on Chip" comprising a CPU, busses, hardware accelerators and interfaces on one single chip. In contrast to an FPGA (Field Programmable Gate Array) which can be denoted as a reprogrammable variant of an ASIC which may be used in prototypes, an ASIC can not simply be reprogrammed but is fixed after production.

A FIFO (First In First Out) may denote a special kind of buffer. Data words written to this buffer are queued up in the order they are written. Reading from this buffer returns the data words in the same order they were written and at the same time removes them from the buffer. Data management based on a FIFO architecture has the advantages that it decouples different clock domains, and that a full length can be used with an arbitrary combination of small and big data sections. Furthermore, it may be advantageous that the FIFO can be written while it is read at the same time. A shortcoming of the FIFO architecture is that every read access has an irreversible impact. For instance, it is not possible to just read a header and to decide to not process this data section directly afterwards. The header is already removed from to FIFO and has to be stored in another place to have it available later. Another shortcoming of a conventional FIFO is that it is only possible to access the most front data element in the FIFO.

A "mailbox" may be denoted as a data management architecture in which a sender may input data into a repository such as a memory and operates a kind of button. This terminates access of the sender to the data in the memory and enables access for a recipient to the data in the memory. An advantage of a corresponding data management architecture is the possibility of a random access on all data of the provided repository. Such a data management architecture has however the shortcomings that, if data sections are of different size, the repository must be prepared for the biggest one (smaller data sections waste memory), and that it does not decouple clock domains. Moreover, switching from one repository to another must not happen during a read access and additional synchronization might be needed.

In computing, a shared memory may denote a memory that may be simultaneously accessed by multiple programs or users with the intent to provide communication among them or avoid redundant copies. Depending on context, programs may run on a single processor or on multiple separate processors. Such a data management concept is quite simple and fast. However, reading and writing must be synchronized, for instance a ring buffer might not be read while it is already being overwritten again. Another shortcoming is that the administration of the buffer is shifted to the software, which may be slow and may consume CPU time.

Hence, each of the above mentioned data management architectures has individual shortcomings.

SUMMARY

It is an object of the invention to enable an efficient data management.

In order to achieve the object defined above, a device for managing transmission of data words between a data source entity and a data destination entity, a method of managing transmission of data words between a data source entity and a data destination entity, a computer program adapted to perform such a method, and a computer-readable medium product comprising such a computer program according to the independent claims are provided.

According to an exemplary embodiment of the invention, a device for managing transmission of data words between a data source entity and a data destination entity is provided. The device comprises a write interface (which may particularly operate as a slave write interface) for receiving data words from the data source entity and a read interface (which may particularly operate as a slave read interface) for forwarding (particularly the previously written) data words to the data destination entity (particularly enabling the data destination entity to read the written data words). The device further comprises a buffer memory adapted for temporarily storing data words to be transmitted from the write interface to the read interface, wherein the data words are stored in an order (particularly in a temporal order) in which they are received from the write interface (particularly, the order of storing the data words may follow the chronology according to which the data words are received via the write interface). The data words in the buffer memory may be addressable (particularly, each data word in the buffer memory may be individually addressable in accordance with a selection made by a data destination entity reading individual data words or parts thereof) for reading (for instance regardless of a position of the read data word in a queue in accordance with the order of storing) at least a part of an addressed data word (particularly for reading an addressed data word completely or partially) without removing any data from the buffer memory for the read process, or in other words in such a way that the data remains stored in the buffer memory after reading.

According to another exemplary embodiment of the invention, a method of managing transmission of data words between a data source entity and a data destination entity is provided, wherein the method comprises receiving data words from the data source entity via a write interface and forwarding the data words to the data destination entity via a read interface. The method further comprises temporarily storing data words to be transmitted from the write interface to the read interface in a buffer memory, wherein the data words are stored in an order in which they are received from the write interface. The method further comprises addressing the buffer memory for reading at least a part of an addressed data word, wherein this data word remains stored in the buffer memory after reading.

According to still another exemplary embodiment of the invention, a computer program is provided comprising code adapted to perform the steps of the above method having the above mentioned features when loaded into a processing unit.

According to yet another exemplary embodiment of the invention, a computer-readable medium product is provided which comprises at least one computer program having the above mentioned features.

Embodiments of the present invention also concern computer programs comprising portions of software codes in order to implement the method as described above when operated at a respective device. A computer program can be stored on a computer readable medium. A computer-readable medium can be a permanent or rewritable memory within a respective device or located externally. A computer program can be also transferred to a respective device for example via a cable or a wireless link as a sequence of signals.

Data processing which may be performed according to embodiments of the invention can be realized by a computer program, that is by software, or by using one or more special electronic optimization circuits, that is in hardware, or in hybrid form, that is by means of software components and hardware components.

The term "data words" or data elements may particularly denote any formatted units of data which are to be transferred from a data source entity to a data destination entity. For example, a data word may include 16 bit of data or 32 bit of data. Such data words may be transmitted in the form of packets or as any other kind of data stream. Data packets may comprise a header and a payload section. The header may include information regarding the data packet. The payload section may include the actual use data to be transmitted. The payload section may include a number of data words that carries the data content.

The term "write interface" may particularly denote a communication interface via which data words to be transmitted may be supplied by a data source entity. Accordingly, the term "read interface" may particularly denote a communication interface via which data words may be read by a data destination entity.

The term "buffer memory" may particularly denote a data storage unit having the capability to store a certain amount of data, wherein this data storage unit can be managed in a manner that the data words are stored temporarily and are deleted when they are not needed any longer to free up the memory for receiving new data words.

The term "addressable" (or capable of being addressed) may particularly denote that data words stored temporarily in the buffer memory may each have an assigned individual address or identifier based on which a data destination entity desiring to read an individual data word or a part thereof may access an individual one of the data words using this address. Addressability of the buffer memory may be denoted as its ability to individually respond to a message sent to the buffer memory and relating to a specific data word being presently stored by the buffer memory.

According to an exemplary embodiment of the invention, a data management system may be provided which is based on a FIFO principle, i.e. stores data words in a buffer memory in an order according to which they are received from the write interface, however making the stored content of this buffer memory transparent from a read side. This transparency may enable a data destination entity to access any desired data word in the buffer memory based on an individual address of the respective data word. Hence, any desired or selected data word in a sequence of data words processed by the buffer memory may be accessed via the read interface regardless of a position of the desired or selected data word in a queue of data words presently stored by the buffer memory. This may allow to benefit from all advantages of the FIFO concept and at the same time to equip the reading side with a flexibility in deciding which of a plurality of data words in a queue in the buffer memory should be processed or accessed next. For instance, it may be desired or required in specific cases to get access to a data word which is not the next one in a queue. An embodiment of the invention therefore allows the reading data destination entity to access even such a data word being located later in the queue within the buffer memory by addressing this data word based on its address in the buffer memory.

For the data destination entity, it may be sufficient to read only a part of the data words in the buffer, for instance only the header of a packet, for making a decision whether to process the entire packet now, later or not at all. According to an exemplary embodiment, such a read access to the modified FIFO does not automatically delete the read data words from the queue in the buffer memory, but may keep those data words until deletion or invalidation is actively triggered.

Thus, a device may be provided which appears on a sender side as a conventional FIFO but which allows on a receiver side for a (particularly non-destructive) access even to data words which are not positioned at the very front of the queue of data words. An address of a data word may be used on a reader side for identifying individual data words.

In the following, further exemplary embodiments of the device will be explained. However, these embodiments also apply to the method, to the computer program and to the computer-readable medium product.

The buffer memory may be adapted for invalidating a read data word from the buffer memory (particularly only) upon receipt of an invalidation command. In other words, a dedicated deletion instruction is required for triggering deletion of one ore more read data words from the buffer memory. This enables reading data words based on their address even if their entire processing is not desired by a data destination entity at the moment. This may safely prevent undesired deletion of data words. One additional operation may be needed to invalidate the already read and used content of the FIFO. With this invalidate operation, the number of elements may be removed from the FIFO and the memory may be freed to perform new tasks. Afterwards, the rest of the elements may again be addressed from the base address on. Since, according to the described embodiment, data words are not automatically deleted upon reading out such data words from the FIFO, it is possible to perform a write access to an "invalidate register" in order to remove a corresponding number of data words from a front end of the FIFO. Invalidation of a data word may be performed after reading, without reading or during reading.

According to an embodiment, one or more data words may be invalidated. For instance, a number of data words at the beginning of the sequence of data words may be deleted (for example by simply shifting a corresponding pointer). The handling of the data words in the FIFO may be out-of-order (of the sequence according to which the data words are supplied), however the invalidation is performed in-order. This avoids memory fragmentation and makes the implementation and handling much easier. According to another embodiment, deletion of one or more data words in a middle part (or even in an end part) of the sequence of data words may be possible as well. The latter embodiment may involve re-copying of data words in the FIFO.

In an embodiment, the invalidation command may be to be received as a separate operation after reading. Therefore, not the reading operation is the trigger of the deletion or invalidation of the data word, but a separate invalidation command which can be sent from a user to the buffer memory. Also a data destination entity may send such an invalidation command to the buffer memory to trigger deletion of a data word from the buffer memory, for instance after having finished processing of the data word.

Data words in the buffer memory may be addressable via the read interface for reading only a header of a data packet. Such a data packet may include an addressed data word. A header may refer to supplemental data, for instance meta data, placed at the beginning of a block of data being stored or transmitted. Therefore, further information regarding the data packet/data word which information can be included in the header may be read first before processing. This allows to improve the order of processing data words by a data destination entity accessing data words via the buffer memory. Hence, processing resources may be used more efficiently.

For example, the header may comprise information indicative of a length of a data packet. Based on this information, a data destination entity accessing the header of a data packet may decide whether there is presently sufficient capability to process this data packet. Additionally or alternatively, a source type of a data packet and/or a destination type of a data packet may be included in the header so that origin and/or target of data may be evaluated. Also a data format or other information may be included in the header.

In an embodiment, the buffer memory may—as a default mode—be adapted for temporarily storing the data words to be transmitted from the write interface to the read interface in accordance with a first in, first out (FIFO) scheme. Therefore, a default mode of processing and outputting the data words in the buffer memory may be the order according to which the data words are written into the buffer memory. However, this default mode may be refined by embodiments of the invention by enabling a data destination entity to prepone a data word later in the queue for read out, so that a modification of a pure FIFO scheme can be selected. This increases the flexibility of the data management.

In an embodiment, the buffer memory may comprise a write section and a read section, the write section being coupled to the write interface and operating in accordance with a first clock rate (for instance a source clock rate of the data source entity). The read section may be coupled to the read interface and may operate in accordance with a second clock rate (for instance a destination clock rate of the data destination entity), wherein the second clock rate may differ from the first clock rate. By dividing up the buffer memory (or a unidirectional part thereof) into write section and read section, a clearly defined interface between these two sections can be provided at which the clock rates can be different. This allows to couple different clock domains to one another. In other words, a clock rate interface may be provided between write section and read section allowing the device to communicate with data source entity and data destination entity operating at different clock rates. This is typical for dual-port RAMs which have a write and a read interface with two unrelated clock-domains. Regarding the separation of clock domains the Addressable FIFO does not have to differ from a normal FIFO.

In an embodiment, the device may be adapted as a Field Programmable Gate Array communicatively coupled via External Memory Interfaces to the data source entity and the data destination entity. Therefore, the device may be configured as an FPGA which may be provided separately from the communicatively coupled data source entity and data destination entity.

In an alternative design, the device may further include the data source entity and the data destination entity communicatively coupled to the buffer memory via an internal data bus. Thus, data source entity, data destination entity and buffer memory including the interfaces may be integrally formed in a single electronic component, for instance as a common monolithically integrated circuit. In such a scenario, it may be particularly appropriate to provide the device as an Application Specific Integrated Circuit (ASIC).

In an embodiment, the data source entity and the data destination entity may comprise a Central Processing Unit (CPU). A CPU or processor may denote an electronic circuit that can execute computer programs. The device may particularly couple two different CPUs even having different properties such as different clock rates.

In an embodiment, the device may be adapted for communicating within a telecommunications network. Therefore, the data words to be evaluated and processed may relate to voice data. More particularly, the device may be adapted for communicating in accordance with Long Term Evolution (LTE). LTE may denote a 3GPP protocol for mobile telecommunications networks, designed to increase data rates. LTE is standardized in 3GPP release 8. LTE concerns a network which is based purely on the Internet protocol as the transport mechanism.

According to an exemplary embodiment of the invention, it may be possible to combine the advantages of a FIFO data management architecture and a "mailbox" data management architecture to follow a zero copy approach in a convenient and efficient way. Instead of having fixed size "mailbox"—repositories, the FIFO may be made addressable on the read side and a read access does not remove elements from it.

Exemplary embodiments of the invention may have the advantage of decoupling of different clock domains possible (like in a conventional FIFO solution). Moreover, embodiments may allow for a flexible use of the available memory. No waste of memory for small data sections occurs (like in a conventional FIFO solution in opposite to a "mailbox" system). Furthermore, the architecture according to an exemplary embodiment may allow for a zero copy operation: The software driver can provide memory mapped access to the FIFO. No intermediate buffers are needed.

Hence an addressable FIFO according to an exemplary embodiment of the invention may provide all advantages of a conventional FIFO solution and may avoid an additional memory/DMA transfer together with the associated buffer space on CPU side. DMA (Direct Memory Access) may be used to distinguish from a CPU based data transfer. A DMA transfer is performed by a specific hardware block (DMA controller) which can perform data transfers autonomously after started via CPU. This may reduce especially for large data sections the internal bus load and latency (and also the CPU load).

Particularly, two different scenarios may be distinguished according to exemplary embodiments of the invention. In one scenario, a packet or data block may be processed directly in the FIFO. This scenario may be appropriate for small data blocks since it makes the implementation of copying of data by Direct Memory Access (DMA), which always involves some overhead, dispensable. In another scenario, the packet or data block may be copied by Direct Memory Access (DMA) into a RAM (Random Access Memory). This may be advantageous for larger data blocks for which the direct processing by the FIFO may be less appropriate.

The aspects defined above and further aspects of the invention are apparent from the examples of embodiment to be described hereinafter and are explained with reference to these examples of embodiment.

BRIEF DESCRIPTION OF THE DRAWINGS

Embodiments of the invention will be described in more detail hereinafter with reference to examples but to which the scope is not limited.

DETAILED DESCRIPTION

The illustration in the drawing is schematically. In different drawings, similar or identical elements may be provided with the same reference signs.

In the following, referring to FIG. 1, a device 100 for managing transmission of data words between a data source entity 102 and a data destination entity 104 according to an exemplary embodiment of the invention will be explained.

The data source entity 102 may be configured as a first central processing unit (CPU1). The data destination entity 104 may be configured as a second central processing unit (CPU2). Between the data source entity 102 and the data destination entity 104, a write interface 106 for receiving data words from the data source entity 102 and a read interface 108 for forwarding data words to the data destination entity 104 are arranged. On the write side, data source entity 102 uses a data bus 140 to convey data words to the write interface 106. In this communication path, the data source entity 102 acts as a master, and the write interface 106 as a slave. On the read side, read interface 108 is coupled via a data bus 142 to the data destination entity 104. In this communication path, data destination entity 104 acts as a master and the read interface 108 as a slave. Reference numeral 114 in FIG. 1 denotes a communication interface of the data destination entity 104. Reference numeral 115 denotes a communication interface of the data source entity 102.

Sandwiched between the write interface 106 and the read interface 108 is a buffer memory 110 which is adapted for temporarily storing data words to be transmitted from the write interface 106 to the read interface 108. The data words may be stored in an order in which they are received from the write interface 106, thereby reflecting a write chronology.

According to the described embodiment, data words in the buffer memory 110 are addressable from the read side, i.e. from the data destination entity 104, for reading an individually addressed data word or a part thereof in such a way that this data word remains stored in the buffer memory 110 after reading. Thus, a desired data word presently stored within the buffer memory 110 may be selected for read out by the data destination entity 104 based on an address of this specific data word. Furthermore, data words presently stored in the buffer memory 110 are transparent for the data destination entity 104 so that not only an access to a front one of these data words is possible for the data destination entity 104, but also to data words being later in the queue.

Next, the internal constitution of the buffer memory 110 will be described. In a data transmission direction from the left-hand side of FIG. 1 towards the right-hand side of FIG. 1, data words may be provided from the data source entity 102 via the write interface 106 towards a write section 120 of the buffer memory 110. In the write section 120, four data words indicated by arrows are shown which are provided according to the chronology of writing them from the data source entity 102 into the buffer memory 110. In a similar way as persons queuing in a bus line, the individual data words are transported through the write section 120 and subsequently to a communicatively coupled read section 122.

It may happen that the data source entity 102 operates at a different clock frequency as compared to the data destination unit 104. Thus, a conversion from the first clock rate of the data source entity 102 to the second clock rate of the data destination entity 104 is performed by the device 100.

In case the data destination entity 104 desires to read out data words provided in the read section 122, it is possible that the data destination entity 104 does not address the data word being closest to the read interface 108 (as in a conventional FIFO architecture), but it is for instance possible that the data destination entity 104 desires to read the "data word 3" in the read section 122. This is indicated schematically in FIG. 1. In such a scenario, the data destination entity 104 does not have to wait until the "data word 3" is the closest one to the read interface 108, but it may address this "data word 3" by a corresponding data word address so as to read out the content of this "data word 3" partially or completely at any desired time as soon as it is available.

Figure 1:
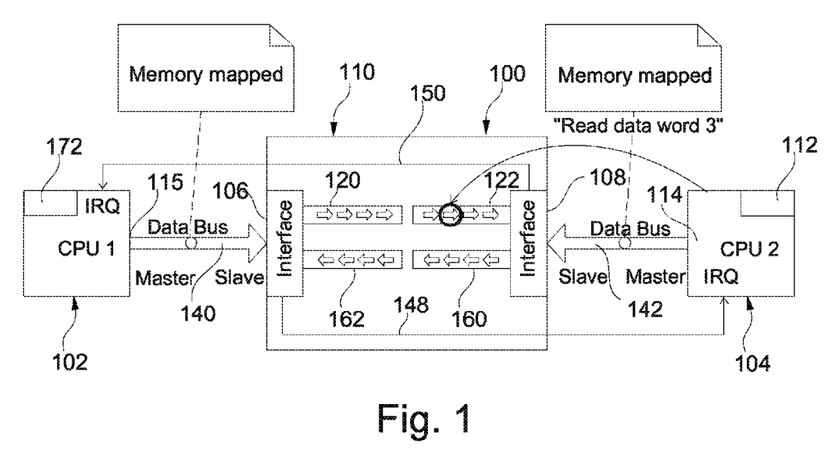
FIG. 1 shows a device comprising an addressable FIFO data exchange according to an exemplary embodiment of the invention.

In the embodiment of FIG. 1, only the data words in the read section 122 are visible and freely selectable by the data destination unit 104. However, the splitting of the buffer memory 110 into the write section 120 and the read section 122 is optional so that it is also possible that the data destination entity 104 can get access to each individual data word included in the buffer memory 110. More generally, also the separation between the write section 120 and the read section 122 is not necessary, and the FIFO function of the device splits the clock domains.

Coming back to the above example, reading "data word 3" by data destination entity 104 does not automatically delete "data word 3" from the queue in the read section 122. In contrast to this, a separate invalidation command has to be sent from the data destination entity 104 to the buffer memory 110 for deleting "data word 3" after reading and processing. Thus, a separate command may be used for deleting as compared to the reading.

A reason for this data management of already read data words will be explained next: It is possible that the data destination entity 104 does not read the entire content of the a data packet, but for instance only a header. Then, the data destination entity 104, or more precisely a receiver 112 which may form part of the data destination entity 104, may freely decide whether the data packet should be processed now or later. Since the data packet is not deleted automatically upon reading, the decision when to process the accessed data packet is not limited for the data destination entity 104 in any way.

The data source entity 102 may supply several data words via the write interface 106 to the buffer memory 110. Upon finishing writing a number of data words, this may be indicated to the data destination entity 104 by a communication message 148 which may be denoted as an IRQ (Interrupt Request) message. In a similar manner, a communication message 150 sent from the read interface 108 to the data source entity 102 may indicate that a reading operation is finished.

It may be advantageous that the data source entity 102 requests from the buffer memory 110 the memory status, i.e.

whether there is presently sufficient free memory capacity within the buffer memory 110 to enable further data words to be supplied by the data source entity 102 to the buffer memory 110. In a similar manner, it may be advantageous that the data destination entity 104 requests from the buffer memory 110 the memory status, i.e. whether there are presently unread data words within the buffer memory which can be accessed by the data destination entity 104. Such status registers represent signals provided by the addressable FIFO. This are num_words_in_buffer memory 110 for the read side and num_words_left_to_write on the write side. With this data source entity 102 and data destination entity 104 can always know when they can read or write. Beside this, data source entity 102 and data destination entity 104 can work completely independent of each other on the buffer memory 110.

As can further be taken from FIG. 1, the write interface 106 needs not only be a write interface, but can also be a read/write interface, since a further write section 160 and a further read section 162 enable communication from the interface 108 to the interface 106, so that also the read interface 106 can operate as a read/write interface. In other words, bidirectional communication and data exchange between data entities 102, 104 is enabled by buffer memory 110.

Hence, FIG. 1 shows a block diagram of an addressable FIFO data exchange according to an embodiment of the invention. With the addressable FIFO architecture, if data source entity 102 (CPU1) wants to transfer data (in form of packets) to data destination entity 104 (CPU2), the following steps are performed:

(1) Data source entity 102 writes data to the write section 120 of buffer memory 110 acting as a modified FIFO. Address for every data word is ignored as long as it is within a specific range assigned to the buffer memory 110. Data words are put into the buffer memory 110 in the order they are written.

(2) Data source entity 102 may issue an interrupt to data destination entity 104, for instance by writing to a specific register in the interface block.

(3) Data destination entity 104 reads the status (which may be a number of valid data words) of the read section 122 (which may be denoted as a read FIFO) and reads the packet header. The packet header should be already available as the reaction on the interrupt on data destination entity 104 is significantly higher than the propagation time from write section 120 (which may be denoted as write FIFO) to read section 122. The header contains the information about the packet length (and optionally some other information like source/destination/type).

(4) The data can now be delivered on data destination entity 104 to the receiver 112 of this packet using a callback pointing directly to the position within the buffer memory 110. The customer knows what to do with this message and can perform a memory copying function (memcpy) to the final position or just read out the information and take actions directly. No intermediate buffer is needed.

(5) Once the customer has finished processing the packet, the callback function returns and the packet in the buffer memory 110 including its header is freed by writing to a specific register ("invalidate") in the interface block.

The part containing the buffer memory 110 can either be a FPGA connected to both CPUs 102, 104 via their External Memory Interface (EMIF) or a block together with the two CPUs 102, 104 on the same ASIC, connected via the internal data bus, for instance Advanced High-performance Bus (AHB), Advanced eXtensible Interface (AXI), etc.

Receiver 112 may form part of data destination entity 104 or may, in an alternative embodiment, be a separate entity communicatively coupled to the data destination entity 104.

Furthermore, a sender 172 may form part of data source entity 102 or may, in an alternative embodiment, be a separate entity communicatively coupled to the data source entity 102. Thus, the architecture of FIG. 1 may be symmetric, since the sender 172 may be considered as a counterpart of the receiver 112.

The architecture of FIG. 1 can also be considered in terms of layers. On the sender side, a sender entity (for instance implemented in software) and a driver (which may be used by the actual sender) may be provided. On the destination side, corresponding layers may be provided: a driver on the lower side of the layer sequence, and the actual receiver (which may have registered itself at the driver for this specific data and may be informed about the arrival of the data) above it. The hardware part may cooperate with such a layer architecture.

In the following, referring to FIG. 2, a method 200 of managing transmission of data words form a data source entity 102 via a buffer memory 110 to a data destination entity 104 according to an exemplary embodiment of the invention will be explained.

In a procedure 202, the data source entity 102 requests from the buffer memory 110 the memory status, i.e. whether there is presently sufficient free memory capacity within the buffer memory 110 to enable further data words to be supplied by the data source entity 102 to the buffer memory 110. In a procedure 204, provided that there is free memory capacity, data words 1, 2, 3, 4 are written from the data source entity 102 into the buffer memory 110, so that the data words 1, 2, 3, 4 are received from the data source entity 102 via a write interface of the buffer 110. As can be taken from reference numeral 206, the buffer memory 110 then stores the data words 1, 2, 3, 4 temporarily in the received chronological temporal order.

All mentioned procedures up to procedure 206 may—from a logical and/or temporal point of view—be independent and hence decoupled from the procedures which will be described in the following.

Before reading out data words from the buffer 110 by the data destination entity 104, the data destination entity 104 requests from the buffer memory 110 the memory status in a procedure 208, i.e. whether there are presently unread data words within the buffer memory 110 which can be accessed by the data destination entity 104.

A conventional way of processing the data words would be to first process data word 1 followed by data word 2 followed by data word 3 and followed by data word 4.

However, according to an exemplary embodiment of the invention, the data destination entity 104 may read header data in a procedure 210 by memory access.

The data destination entity 104 may then directly access the buffer memory 110 for reading the "data word 3" in a procedure 214. Then, the data destination entity 104 can process the "data word 3" in a procedure 218.

The mere reading 208, 210, 214 does not yet delete "data word 3" from the buffer memory 110. In contrast to this, invalidation or deletion of the "data word 3" in the buffer memory 110 is initiated or triggered by a separate procedure 220. In an embodiment, it is possible to delete data words 1,2,3 at once and together. Deleting all these data words 1, 2, 3 together allows for a very simple memory management, since no re-copying of individual data words is necessary and no complex fragmentation procedures need to be run. Furthermore, the entire memory capacity for such an embodiment is very small and the required amount of memory for the same storage capacity is considerable bigger when the memory can get fragmented. However, in another embodiment, it is also possible that data word 3 is deleted isolatedly without deleting data words 1, 2 which are at the front in the queue of data words 1, 2, 3, 4. Such an embodiment provides a high degree of functionality but also requires a more complex memory management as compared to the deletion of multiple data words in groups. A main reason for deleting something is to free memory space for further writes. If the memory is big enough, it is possible to wait with the deletion of for example "data word 3" when data words 1 and 2 are consumed, which can be much later in time and after data words with higher indices are processed.

Figure 2:
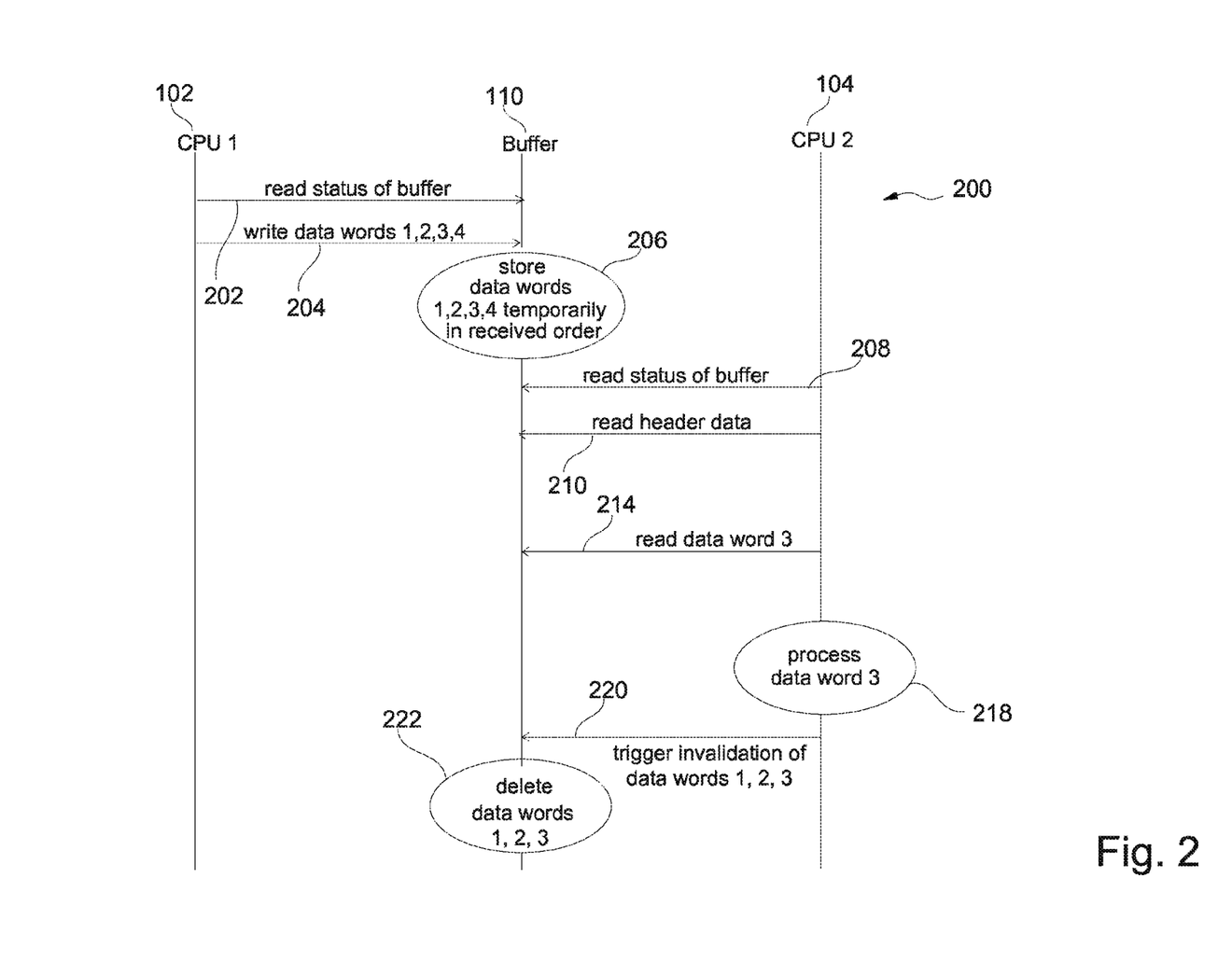
FIG. 2 illustrates a sequence of steps of a method of managing transmission of data words between a data source entity and a data destination entity according to an exemplary embodiment of the invention.

Actions of the data destination entity 104 mentioned in FIG. 2 can also at least partially be performed by or in conjunction with receiver 112 forming part of the data destination entity 104 (for instance one or more of reading operations 208, 210, 214, the processing operation 218, and/or the invalidation operation 220).

Although the example of FIG. 2 describes a process of invalidating data words 1, 2, 3 or data word 3, it is of course possible in a simple embodiment to invalidate data word 1 which is written at first, i.e. before writing data words 2, 3, 4.

Figure 3:
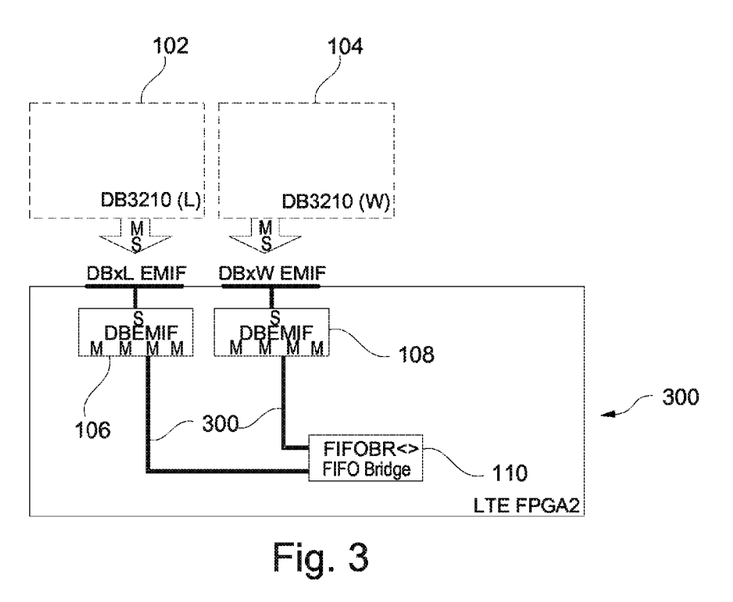
FIG. 3 shows a block diagram of an LTE device reduced to FIFO related parts according to an exemplary embodiment of the invention.

FIG. 3 shows a block diagram of an LTE device according to an exemplary embodiment of the invention reduced to the FIFO related parts.

Arrows in FIG. 3 relate to an External Memory Interface (EMIF) and point from a bus master (M) to a slave (S). However, the data transfer may be in two directions. Reference numeral 300 refers to an Internal Buffered Communication Link (IBCL).

FIG. 3 shows the principle of an addressable FIFO which is implemented in two FPGAs in accordance with LTE. The addressable FIFO chain starts with a DB-EMIF block 106 which makes status/control registers (for instance which registers exactly) and the data itself accessible from the one CPU 102 (or ASIC in this case). DB-EMIF 106 is connected via Internal Buffered Communication Link (IBCL) 300 to FIFOBR 110 which does nothing but to connect the write FIFO portion of the one side with the read FIFO portion of the other side (and vice versa). On the other side there is again a DB-EMIF block 108 to connect the other CPU 104 (or ASIC). The mechanism can be used within an LTE embodiment together with an OSE-Linkhandler to transfer IP packets between two digital baseband chips. A Linkhandler may denote an OSE (Operating System Enea) mechanism to allow convenient inter process communication beyond CPU borders. The embodiment of FIG. 3 may be implemented in a mobile phone.

Figure 4:
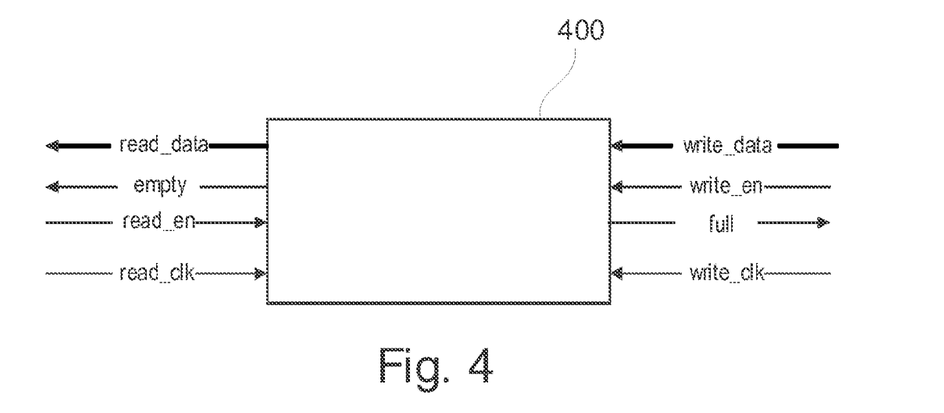
FIG. 4 shows a block diagram of a conventional FIFO.
Figure 5:
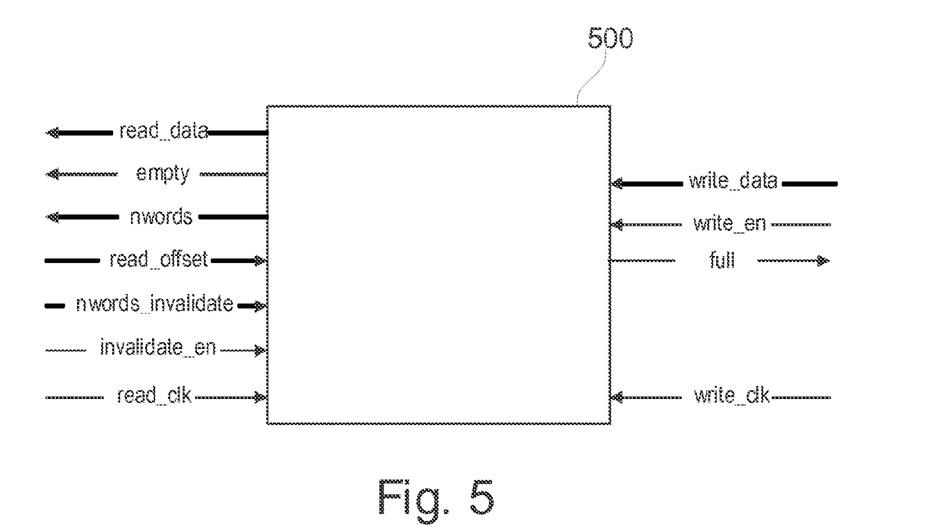
FIG. 5 shows a block diagram of an addressable FIFO according to an exemplary embodiment of the invention.

FIG. 4 shows a low level hardware implementation of a conventional FIFO 400 in comparison with a low level hardware implementation of an addressable FIFO 500 according to an exemplary embodiment of the invention as shown in FIG. 5.

The Addressable FIFO 500 can be a "first-word-fall-through"-type or a normal buffered FIFO. Optional signals like n_words writeable or almost_full are possible although not mentioned in the figure. As can be taken from FIG. 4 and FIG. 5, the write side of the addressable FIFO 500 equals to the write side of the conventional FIFO 400. The read side includes differences.

The following operations of the addressable FIFO 500 equal to corresponding operations of the conventional FIFO 400:

read_data: read data signals (equal to FIFO 400 when read_offset is 0)

empty: indicates status of buffer, i.e. buffer is empty (nwords is 0 when the Addressable FIFO is empty)

read_en: read procedure enabled—deletes word 0 in the FIFO, word 1 then becomes word 0, the result is the same as when nwords_invalidate is 1 and invalidate_en gets enabled.

read_clk: clock on read side write_data: write data signals full: indicates status of buffer, i.e. buffer is full write_en: write procedure enabled—the values on the write_data signals are overtaken by the FIFO if this signal is high. The data word will be put at the end of the FIFO.

write_clk: clock on write side

The following operations can be performed additionally by the addressable FIFO 500 (read_en is no longer provided):

read_offset is the address for the read data word relative to the first data word (0)

nwords indicates how many data words are available on the read side     nwords_invalidate and invalidate_en clear an amount of data words relative to the most front data word In the following and referring to FIG. 6, a method of managing transmission of data words between a data source entity 102 and a data destination entity 104 according to another exemplary embodiment of the invention will be explained.

Figure 6:
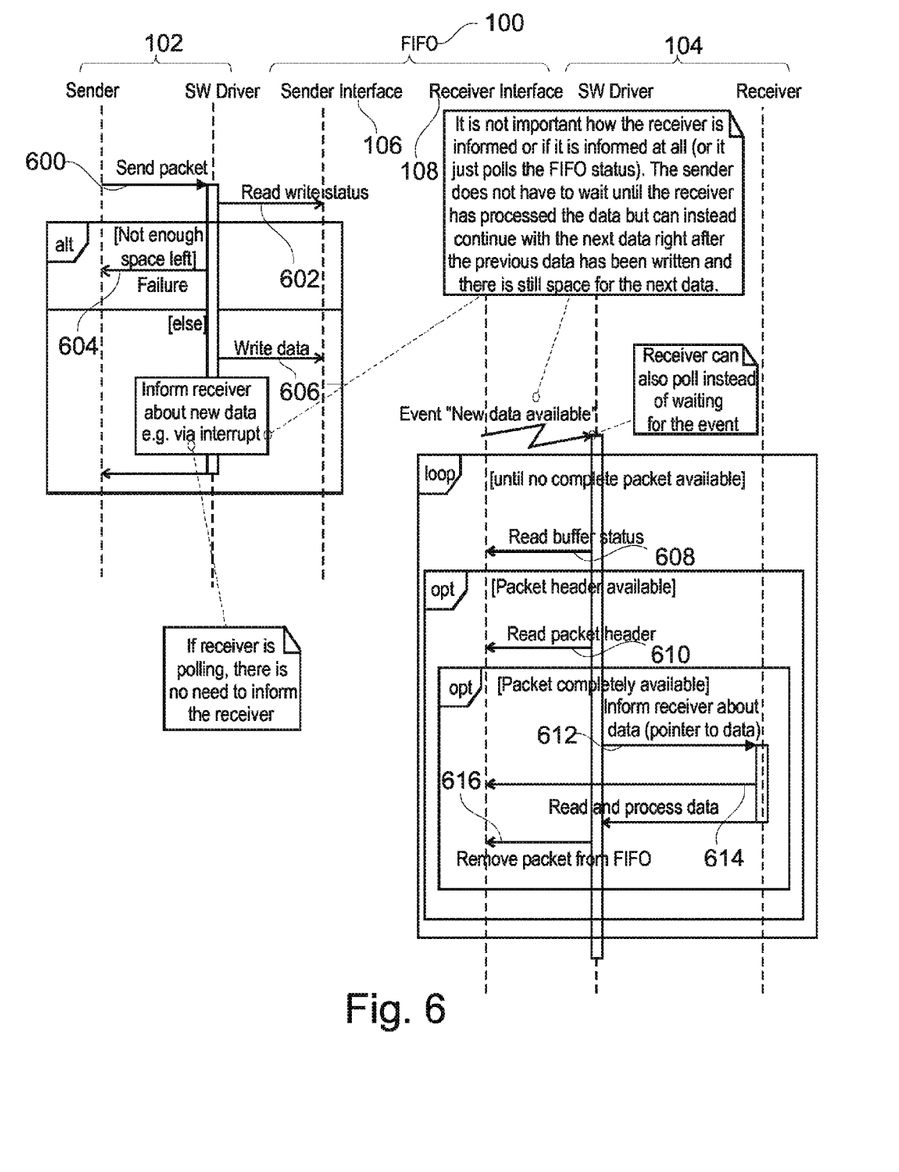
FIG. 6 illustrates a sequence of steps of a method of managing transmission of data words between a data source entity and a data destination entity according to another exemplary embodiment of the invention.

FIG. 6 shows the cooperation between a sender and a software (SW) driver forming part of the data source entity 102. FIG. 6 furthermore shows the cooperation between a receiver and a software (SW) driver forming part of the data destination entity 104.

When the sender of the data source entity 102 desires to send a packet (compare operation 600), the corresponding software driver firstly checks by a read write status message 602 to the sender interface 106 of the FIFO 100 whether the FIFO 100 still has capacity to receive new data words. If there is no sufficient memory capacity left, this is communicated by a failure message 604 to the sender, otherwise the new data word(s) is/are written via the sender interface 106 into the FIFO 100, compare write data message 606.

Subsequently, the receiver may or may not be informed about the new data word(s) available for readout.

For reading out one or more new data words—which reading may be dependent on a previous writing procedure or may be independent from such a previous writing procedure—the software driver of the data destination entity 104 may firstly readout the status of the FIFO 100 in a read buffer status message 608, i.e. may check whether one or more further data words are available in the FIFO 100.

For reading out, the software driver may optionally read a packet header in a read packet header message 610. In a message 612 to be sent from the software driver to the receiver, the receiver may be informed about available data. The receiver may then read the data from the receiver interface 108 in a message 614 and may process the data. The software driver may then, in a separate message 616, remove packets from the FIFO 100.

Although specific examples have been explained herein, many alternatives are of course possible. Any kind of data structures can be handled with the disclosed architecture, including data packets, data streams, etc. Upon writing of data words in the buffer by a data source entity, a data destination entity accessing such data words may or may not be informed about the event of writing. Data source entity and data destination entity may be completely decoupled from one another or may cooperate with one another.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A data transmission system, comprising:
a receiver associated with a data destination entity;
a device for managing transmission of data words between a data source entity and the data destination entity, the device comprising:
    a write interface configured to receive data words from the data source entity;
    a read interface configured to forward data words to the data destination entity;
    a buffer memory configured to temporarily store data words to be transmitted from the write interface to the read interface, wherein the data words are stored in an order in which they are received from the write interface;
    wherein data words in the buffer memory are addressable for reading at least a part of a data word in such a way that the corresponding data word remains stored in the buffer memory after reading;
wherein the receiver is configured to:
    cause at least part of a first data word to be read from the buffer memory via the read interface;
    determine whether the first data word should be processed now or later;
    in response to determining that the first data word read from the buffer memory should be processed later:
        cause a different second data word to be read from the buffer memory;
        thereafter, both cause the first data word to be read from the buffer memory and process the first data word;
        thereafter, send an invalidation command to the buffer memory instructing the buffer memory to delete the first data word;
    wherein the first data word remains in the buffer memory until receipt of the invalidation command by the buffer memory.

2. The system of claim 1, wherein the buffer memory is further configured to invalidate one or more read data words from the buffer memory upon receipt of the invalidation command.

3. The system of claim 1, wherein the data destination entity comprises the receiver.

4. The system of claim 1, wherein data words in the buffer memory are addressable via the read interface for reading only a header.

5. The system of claim 4, wherein the header comprises information on one or more of:
a length of a data packet;
a source type of a data packet; and
a destination type of a data packet.

6. The system of claim 1, wherein the buffer memory is configured to allow invalidation of the data words in a sequence in which they are transmitted from the write interface.

7. The system of claim 1:
wherein the buffer memory comprises a write section and a read section;
the write section being coupled to the write interface and operating in accordance with a source clock rate of the data source entity;
the read section being coupled to the read interface and operating in accordance with a destination clock rate of the data destination entity.

8. The system of claim 1 wherein the device is a Field Programmable Gate Array communicatively coupled via External Memory Interfaces to the data source entity and the data destination entity.

9. The system of claim 8 wherein at least one of the data source entity and the data destination entity comprises a Central Processing Unit.

10. The system of claim 1:
wherein the device is an Application Specific Integrated Circuit;
wherein the data source entity and the data destination entity are communicatively coupled to the buffer memory via an internal data bus.

11. The system of claim 10 wherein at least one of the data source entity and the data destination entity comprises a Central Processing Unit.

12. A method of managing transmission of data words between a data source entity and a data destination entity, the method comprising:
receiving data words from the data source entity via a write interface;
forwarding the data words to the data destination entity via a read interface;
temporarily storing data words to be transmitted from the write interface to the read interface in a buffer memory, wherein the data words are stored in an order in which they are received from the write interface;
addressing data words in the buffer memory for reading at least a part of a data word, wherein this data word remains stored in the buffer memory after reading;
a receiver, associated with the date destination entity, causing at least part of a first data word to be read from the buffer memory via the read interface;
the receiver determining whether the first data word should be processed now or later;
the receiver, in response to determining that the first data word read from the buffer memory should be processed later:
    causing a different second data word to be read from the buffer memory;
    thereafter, both causing the first data word to be read from the buffer memory and processing the first data word;
    thereafter, sending an invalidation command to the buffer memory instructing the buffer memory to delete the first data word;
wherein the first data word remains in the buffer memory until receipt of the invalidation command by the buffer memory.

13. The method of claim 12 wherein the data destination entity comprises the receiver.

14. The method of claim 13, further comprising the buffer memory invalidating the first data word in response to receipt of the invalidation command.

* * * * *